US010421529B2

(12) United States Patent
Napier et al.

(10) Patent No.: US 10,421,529 B2
(45) Date of Patent: Sep. 24, 2019

(54) SWING WING TIP (71) Applicant: Airbus Operations Limited, Bristol (GB)

(72) Inventors: Stefan Napier, Bristol (GB); Robert Hart, Bristol (GB); Matthew Harding, Bristol (GB); Nick Livings, Bristol (GB)

(73) Assignee: Airbus Operations Limited, Bristol (GB)

( * ) Notice: Subject to any disclaimer, the term of this patent is extended or adjusted under 35 U.S.C. 154(b) by 476 days.

(21) Appl. No.: 15/364,865

(22) Filed: Nov. 30, 2016

(65) Prior Publication Data

US 2017/0152016 A1 Jun. 1, 2017

(30) Foreign Application Priority Data

Nov. 30, 2015 (GB) .................................. 1521088.3

(51) Int. Cl.
*B64C 3/56* (2006.01)
*B64C 3/18* (2006.01)

(52) U.S. Cl.
CPC ................ *B64C 3/56* (2013.01); *B64C 3/185* (2013.01)

(58) Field of Classification Search
CPC ................ B64C 3/56; B64C 3/40; B64C 3/42
See application file for complete search history.

(56) References Cited

U.S. PATENT DOCUMENTS

| 2,961,196 | A | 11/1960 | Atkinson |
| 8,651,431 | B1 | 2/2014 | White et al. |
| 8,708,286 | B2 | 4/2014 | Sakurai et al. |
| 9,296,469 | B2 * | 3/2016 | Santini ..................... B64C 3/56 |
| 10,099,770 | B2 * | 10/2018 | Gionta ..................... B64C 3/56 |
| 2013/0313356 | A1 | 11/2013 | Santini et al. |
| 2015/0097087 | A1 * | 4/2015 | Sakurai ..................... B64C 9/00 |
| | | | 244/201 |
| 2017/0043864 | A1 * | 2/2017 | Axford ................... B64C 3/185 |

FOREIGN PATENT DOCUMENTS

GB         1100376 A  *  1/1968  ............... B64C 3/40

OTHER PUBLICATIONS

Pictures of Sept wing Aircraft in Existence Before Nov. 2015, 4 pages.
Combined Search Report and Examination Report cited in GB1521088.3 dated May 19, 2016, 6 pages.

* cited by examiner

*Primary Examiner* — Brian M O'Hara
(74) *Attorney, Agent, or Firm* — Nixon & Vanderhye P.C.

(57) ABSTRACT

An aircraft including a wing 10 having a fixed wing 12 and a swing wing tip device 14 pivotably mounted about a pivot 16 at the tip of the fixed wing, wherein the swing wing tip device 14 is configurable between a flight configuration for use during flight and a ground configuration for use during ground-based operations, where the span of the aircraft wing is reduced. The swing wing tip device 14 includes a receiving portion 48 arranged such that in the ground configuration, portions of the upper wing skin and lower wing skin of the fixed wing which are exposed in the flight configuration are at least partially received within the receiving portion 48 of the swing wing 14.

17 Claims, 7 Drawing Sheets

SWING WING TIP

CROSS RELATED APPLICATION

This application claims priority to Great Britain patent application 1521088.3 filed Nov. 30, 2015, the entirety of which is incorporated by reference.

BACKGROUND OF THE INVENTION

There is a trend towards increasingly large passenger aircraft, for which it is desirable to have correspondingly large wing spans. However, the maximum aircraft span is effectively limited by airport operating rules which govern various clearances required when manoeuvring around the airport (such as the span and/or ground clearance required for gate entry and safe taxiway usage).

Therefore, moveable wing tip devices have been introduced into passenger aircraft, where a wing tip device is movable between a flight configuration for use during flight, and a ground configuration for use during ground-based operations. In the ground configuration, the wing tip device is moved away from the flight configuration such that the span of the aircraft wing is reduced, thereby allowing use of existing gates and safe taxiway usage.

A known type of moveable wing tip device is a swing wing tip device. The term 'swing' wing tip device is typically used when the axis of rotation extends in a direction normal to the plane of the wing, and hence the wing tip device rotates within the plane of the wing. An example of a known swing wing tip system is described in US 2015/0097087. In that arrangement, the fixed wing includes a moveable panel, such as a folding door, at the rear of the wing. The movable panel is folded up prior to the swing wing tip device rotating rearwardly, thereby avoiding clashing between the swing wing tip device and the fixed wing.

Such an arrangement has been found to be relatively complex because it requires actuation of ancillary components (e.g. the movable panel), when the wing tip device is moved.

The present invention seeks to reduce or mitigate the above-mentioned drawback.

SUMMARY OF THE INVENTION

According to a first aspect of the invention, there is provided, an aircraft comprising a wing, the wing comprising a fixed wing and a swing wing tip device pivotably mounted about a pivot at the tip of the fixed wing, wherein the swing wing tip device is configurable between: (i) a flight configuration for use during flight; and (ii) a ground configuration for use during ground-based operations, in which ground configuration the swing wing tip device is swung rearwardly, away from the flight configuration, such that the span of the aircraft wing is reduced. The swing wing tip device comprises a leading edge, a trailing edge, an upper wing skin and a lower wing skin, and a receiving portion located between the upper wing skin and lower wing skin. The fixed wing comprises a leading edge, a trailing edge, an upper wing skin and a lower wing skin, wherein when the swing wing tip device is in the flight configuration, the upper and lower wing skins of the swing wing tip device are substantially continuous with the respective upper and lower wing skins of the fixed wing, and the leading and trailing edges of the swing wing tip device are continuations of the respective leading and trailing edges of the fixed wing. The receiving portion of the swing wing tip is arranged such that in the ground configuration, portions of the upper wing skin and lower wing skin of the fixed wing which are exposed in the flight configuration are at least partially received within the receiving portion of the swing wing tip device.

Advantageously, the arrangement of the receiving portion allows movement of the swing wing tip device from the flight configuration to the ground configuration without the swing wing tip device and the fixed wing fouling each other. The arrangement may also remove the need for moving parts around the trailing edge of fixed wing, for example panels or flaps on the wing skin that are movable in order that the swing wing tip device and the fixed wing do not foul each other. Therefore, a simplified wing structure is provided. There need be no moving parts around the trailing edge of the fixed wing, for example panels or flaps on the wing skin that are movable in order that the swing wing tip device and the fixed wing do not foul each other.

The wing tip device is a swing wing tip device. Thus, the axis of rotation may extend in a direction normal to the plane of the wing, and hence the wing tip device rotates within the plane of the wing.

The swing wing tip device may comprise a frame located between the upper wing skin and lower wing skin of the swing wing tip device. The frame may have an upper portion proximate to the upper wing skin of the swing wing tip device and a lower portion proximate to the lower wing skin of the swing wing tip device. The receiving portion of the swing wing tip device may be located between the upper portion and lower portion of the frame. The frame, and such as the upper and lower portions of the frame, may at least partially define the receiving portion. The frame may be pivotably mounted about the pivot.

The upper and lower portions of the frame may each comprise an inner surface at least partially defining the receiving portion. The inner surfaces may be planar. The inner surfaces may be co-planar with the plane of the wing. The inner surfaces may be normal to the pivot axis. The thickness of the upper and lower portions may taper (such as in a chordwise direction) such that the upper and lower wing skins converge on the respective inner surfaces of the upper/lower portions, at an edge of the swing wing tip device.

The fixed wing may comprises a recessed portion at the tip of the fixed wing. The axis of the pivot may pass through the recessed portion. When the swing wing tip device is in the flight configuration, the recessed portion may be received in the receiving portion of the swing wing tip device. The recessed portion may comprise a planar upper and lower surface. In embodiments in which the frame comprises inner surfaces, the planar upper and lower surfaces may be parallel to those inner surfaces.

The upper wing skin of the fixed wing and the upper wing skin of the swing wing tip device may each comprise an interfacing edge. The interfacing edge of the upper wing skin of the fixed wing and the interfacing edge of the swing wing tip device may form a smooth interface (for example a substantially continuous surface) when the swing wing tip device is in the flight configuration. The interfacing edge of the upper wing skin of the swing wing tip device may be moved away from the corresponding portion of the interfacing edge of the upper wing skin of the fixed wing, when the swing wing tip device is in the ground configuration.

The lower wing skin of the fixed wing and the lower wing skin of the swing wing tip device may each comprise an interfacing edge. The interfacing edge of the lower wing skin of the fixed wing and the interfacing edge of the lower wing skin of the swing wing tip device may form a smooth interface (for example a substantially continuous surface) when the swing wing tip device is in the flight configuration. The interfacing edge of the lower wing skin of the swing wing tip device may be moved away from the corresponding portion of the interfacing edge of the lower wing skin of the fixed wing, when the swing wing tip device is in the ground configuration.

The axis of the pivot may pass through both the fixed wing and the swing wing tip device. At the surface of the wing, the pivot axis may be surrounded by the upper and lower wing skins of the swing wing tip device.

The aircraft may be arranged such that, during movement of the swing wing tip device from the flight configuration, to the ground configuration, part of the interfacing edge of the swing wing tip device is moved over an interfacing edge of the fixed wing.

At least a portion of an interfacing edge may extend in a substantially spanwise direction. At least a portion of an interfacing edge may extend in a straight, spanwise direction. At least a portion of an interfacing edge may extend along the length of the wing (for example parallel to a spar). At least a portion of an interfacing edge may extend in an arc with a centre point located approximately at the pivot at the tip of the fixed wing.

When projected onto a plane parallel with the plane of the aircraft wing, the interfacing edge of the upper wing skin of the swing wing tip device and the interfacing edge of the lower wing skin of the swing wing tip device may coincide and trace approximately the same shape. When projected onto a plane parallel with the plane of the aircraft wing, the interfacing edge of the upper wing skin of the fixed wing and the interfacing edge of the lower wing skin of the fixed wing may coincide and trace approximately the same shape. The plane of the wing may be perpendicular to the axis of rotation of the swing wing tip device as the swing wing tip device is moved between the flight and ground configurations.

The pivot point may be located at, or aft of, the thickest portion of the wing cross section, as otherwise the swing wing tip device will not be able to move backwards without obstruction. The pivot point may be located on, or attached to, the rear spar.

The distance between the interfacing edges of the upper wing skin and lower wing skin of the swing wing tip device, where the interfacing edges border the receiving portion, may be greater than the distance between the interfacing edges of the upper wing skin and lower wing skin of the fixed wing, in the portion of the fixed wing that is exposed in the flight configuration but received within the receiving portion of the swing wing tip device in the ground configuration.

The interfacing edge of the upper wing skin of the fixed wing and the interfacing edge of the upper wing skin of the swing wing tip device may partially overlap when the swing wing tip device is in the flight configuration. The interfacing edge of the lower wing skin of the fixed wing and the interfacing edge of the lower wing skin of the swing wing tip may partially overlap when the swing wing tip device is in the flight configuration. A blade seal may be located between the upper wing skin of the fixed wing and the upper wing skin of the swing wing tip device. A blade seal may be located between the lower wing skin of the fixed wing and the lower wing skin of the swing wing tip device.

At least 80% of the span of the wing may comprise the fixed wing. At least 90% of the span of the wing may comprise the fixed wing.

The fixed wing may comprise a front spar and the swing wing tip device may comprise a front spar, and in the flight configuration the front spar of the fixed wing and the front spar of the swing wing tip device may at least partially overlap. The aircraft may further comprise a locking mechanism associated with the front spar of the fixed wing and the front spar of the swing wing tip device, arranged to lock the front spar of the fixed wing to the front spar of the swing wing tip device when the swing wing tip device is in the flight configuration, such that the front spar of the swing wing tip device is an extension of the front spar of the fixed wing. The locking mechanism may comprise one or more pins extending from one of the front spar of the fixed wing and the front spar of the swing wing tip device into a locking aperture in the other of the front spar of the fixed wing and the front spar of the swing wing tip device. The locking pin and the locking aperture may be engaged such that the front spar of the fixed wing and the front spar of the swing wing tip device are not able to move away from each other. The locking mechanism may be oriented in such a manner as to transfer vertical and/or shear loads from the swing wing tip device to the fixed wing, when the wing is in the flight configuration.

In embodiments having a locking mechanism comprising locking pins, the longitudinal axes of the pins (and of the apertures) may be tangential to a notional circle, centred on the pivot, passing through the pins/holes. This tends to ensure that as the swing wing tip device rotates about the pivot, the pins and respective apertures engage/disengage each other in a substantially linear (tangential) direction.

The fixed wing may comprise a rear spar and the swing wing tip device may comprise a rear spar, and in the flight configuration the rear spar of the fixed wing and the rear spar of the swing wing tip device may at least partially overlap. The aircraft may further comprise a locking mechanism associated with the rear spar of the fixed wing and the rear spar of the swing wing tip device, arranged to lock the rear spar of the fixed wing to the rear spar of the swing wing tip device when the swing wing tip device is in the flight configuration, such that the rear spar of the swing wing tip device is an extension of the rear spar of the fixed wing.

The locking mechanism may comprise one of more pins extending from one of the rear spar of the fixed wing and the rear spar of the swing wing tip device into a locking aperture in the other of the rear spar of the fixed wing and the rear spar of the swing wing tip device. The locking pin and the locking aperture may be engaged such that the rear spar of the fixed wing and the rear spar of the swing wing tip device are not able to move away from each other. The locking mechanism associated with the rear spar of the fixed wing and the rear spar of the swing tip device, may also be arranged to lock the front spar of the swing wing tip device to the fixed wing when the swing wing tip device is in the ground configuration. Advantageously, providing a dual purpose locking mechanism simplifies the wing construction.

The front spar and rear spar of the swing wing tip device may form part of the frame. The frame may further comprise the upper and lower portions described above. The swing wing tip device, and such as the frame, may include an open-box structure. It will be appreciated that an open-box structure is a box structure in which one side is missing. The missing side may be created by the absence of part of the front spar. For example, the front spar may be longitudinally offset (staggered) from the rear spar, such that in the region of the offset, the rear spar and the upper and lower portions form an open-box structure. In the ground configuration, the swing wing tip device may present the open box structure towards the front of the wing. An open box structure may facilitate an arrangement in which the swing wing tip device comprises a receiving portion. Although the open box structure may make the ground configuration unsuitable for flight, it has been recognised that this is not necessarily a problem as the aircraft will not take off whilst the swing wing tip device is in the ground configuration. This is in contrast to some known military swing wing applications, in which it is essential for the wing tip to comprise a closed-box structure as that closed box structure tends to be exposed to freestream airflow during flight.

The swing wing tip device may be a wing tip extension; for example the swing wing tip device may be a planar tip extension. In other embodiments, the wing tip device may comprise, or consist of, a non-planar device, such as a winglet. There may be a smooth transition from the fixed wing to the swing wing tip device. It will be appreciated that there may be a smooth transition, even where there are changes in sweep or twist at the junction between the fixed wing and swing wing tip device. However, there need be no discontinuities at the junction between the fixed wing and swing wing tip device.

In the flight configuration, the span may exceed an airport compatibility gate limit. In the ground configuration the span may be reduced such that the span (with the wing tip device in the ground configuration) is less than, or substantially equal to, the airport compatibility gate limit.

When the swing wing tip device is in the ground configuration, the aircraft incorporating the wing, may be unsuitable for flight. For example, the swing wing tip device may be aerodynamically and/or structurally unsuitable for flight in the ground configuration. The aircraft may be configured such that, during flight, the swing wing tip device is not moveable to the ground configuration. The aircraft may comprise a sensor for sensing when the aircraft is in flight. When the sensor senses that the aircraft is in flight, a control system may be arranged to disable the possibility of moving the swing wing tip device to the ground configuration.

The aircraft may be a passenger aircraft. The passenger aircraft may comprises a passenger cabin comprising a plurality of rows and columns of seat units for accommodating a multiplicity of passengers. The aircraft may have a capacity of at least 20, at least 50 passengers, and more than 50 passengers. The aircraft may be a powered aircraft. The aircraft may comprise an engine for propelling the aircraft. The aircraft may comprise wing-mounted engines, such as underwing mounted engines.

According to a second aspect, the invention provides an aircraft wing for use on the aircraft of the first aspect of the invention. The wing comprises a fixed wing and a swing wing tip device pivotably mounted about a pivot at the tip of the fixed wing, wherein the swing wing tip device is configurable between: (i) a flight configuration for use during flight; and (ii) a ground configuration for use during ground-based operations, in which ground configuration the swing wing tip device is swung rearwardly, away from the flight configuration, such that the span of the aircraft wing is reduced; wherein the swing wing tip device comprises a leading edge, a trailing edge, an upper wing skin and a lower wing skin, and a receiving portion located between the upper wing skin and lower wing skin, and the fixed wing comprises a leading edge, a trailing edge, an upper wing skin and a lower wing skin, wherein when the swing wing tip device is in the flight configuration, the upper and lower wing skins of the swing wing tip device are substantially continuous with the respective upper and lower wing skins of the fixed wing, and the leading and trailing edges of the swing wing tip device are continuations of the respective leading and trailing edges of the fixed wing, wherein the receiving portion of the swing wing tip is arranged such that in the ground configuration, portions of the upper wing skin and lower wing skin of the fixed wing which are exposed in the flight configuration are at least partially received within the receiving portion of the swing wing.

According to a third aspect, the invention provides a swing wing tip device for use on the aircraft of the first aspect and wing of the second aspect. The swing tip device is for pivotally mounting on a fixed wing of an aircraft, the fixed wing having a leading edge, a trailing edge, an upper wing skin and a lower wing skin, wherein the swing wing tip device comprises a leading edge, a trailing edge, an upper wing skin and a lower wing skin, and a receiving portion located between the upper wing skin and lower wing skin, wherein the swing wing tip device is arranged to be configurable between: (i) a flight configuration for use during flight; and (ii) a ground configuration for use during ground-based operations, in which ground configuration the swing wing tip device is swung rearwardly, away from the flight configuration, such that the span of the aircraft wing is reduced; wherein when the swing wing tip device is in the flight configuration, the upper and lower wing skins of the swing wing tip device are configured to be substantially continuous with the respective upper and lower wing skins of the fixed wing, and the leading and trailing edges of the swing wing tip device are configured to be continuations of the respective leading and trailing edges of the fixed wing, and the receiving portion of the swing wing tip is arranged such that in the ground configuration, upper and lower portions of the fixed wing which are arranged to be exposed in the flight configuration are at least partially received within the receiving portion of the swing wing.

According to yet another aspect of the invention, there is provided a fixed wing for use as the fixed wing in the first and second aspects of the invention. The fixed wing may have a leading edge, a trailing edge, an upper wing skin and a lower wing skin, and the fixed wing may be configured to receive a swing wing tip device, the swing wing tip device being configurable between: (i) a flight configuration for use during flight; and (ii) a ground configuration for use during ground-based operations, in which ground configuration the swing wing tip device is swung rearwardly, away from the flight configuration, such that the span of the aircraft wing is reduced; and wherein when the swing wing tip device is in the flight configuration, the upper and lower wing skins of the swing wing tip device are configured to be substantially continuous with the respective upper and lower wing skins of the fixed wing, and the leading and trailing edges of the swing wing tip device are configured to be continuations of the respective leading and trailing edges of the fixed wing. The fixed wing may comprise upper and lower portions which are arranged to be exposed in the flight configuration, but which are at least partially received within a receiving portion of the swing wing when the swing wing tip is in the ground configuration. The upper and lower portions of the fixed wing which are arranged to be exposed in the flight configuration, but which are at least partially received within a receiving portion of the swing wing when the swing wing tip is in the ground configuration, may be fixed (i.e. they may not move relative to their surrounding structure).

According to yet another aspect of the invention, there is provided an aircraft comprising a wing, the wing comprising a fixed wing and a swing wing tip device pivotably mounted about a pivot at the tip of the fixed wing, wherein the swing wing tip device is configurable between: (i) a flight configuration for use during flight; and (ii) a ground configuration for use during ground-based operations, in which ground configuration the swing wing tip device is swung rearwardly, away from the flight configuration, such that the span of the aircraft wing is reduced; wherein the fixed wing comprises a rear spar and the swing wing tip device comprises a rear spar, and in the flight configuration the rear spar of the fixed wing and the rear spar of the swing wing tip device at least partially overlap, and wherein the aircraft comprises a locking mechanism associated with the rear spar of the fixed wing and the rear spar of the swing wing tip device. The locking mechanism is arranged to lock the rear spar of the fixed wing to the rear spar of the swing wing tip device when the swing wing tip device is in the flight configuration, such that the rear spar of the swing wing tip device becomes an extension of the rear spar of the fixed wing. The locking mechanism is also arranged to lock the front spar of the swing wing tip device to the fixed wing when the swing wing tip device is in the ground configuration. Having the same locking mechanism to both lock the rear spars together in the flight configuration, and lock the front spar to the fixed wing in the flight configuration, has been found to provide a simple and space/component-efficient locking arrangement. The locking mechanism may comprise a locking pin associated with one of the fixed wing or the swing wing tip device, and first and second apertures associated with the other of the fixed wing and the swing wing tip device. The first aperture is located such that in the flight configuration the locking pin is received in the aperture to lock the rear spar of the fixed wing to the rear spar of the swing wing tip device. The second aperture is located such that in the ground configuration the same locking pin is received in the second aperture to lock the swing wing tip device to the rear spar of the fixed wing.

It will of course be appreciated that features described in relation to one aspect of the present invention may be incorporated into other aspects of the present invention. For example, the method of the invention may incorporate any of the features described with reference to the apparatus of the invention and vice versa.

DESCRIPTION OF THE DRAWINGS

Embodiments of the present invention will now be described by way of example only with reference to the accompanying schematic drawings of which.

DETAILED DESCRIPTION

Many of the Figures have been produced from Computer Aided Design (CAD) packages. Thus, it will be appreciated that some of the Figures include constructional lines, and/or some lines showing hidden, or internal, features of the embodiment.

Figure 1:
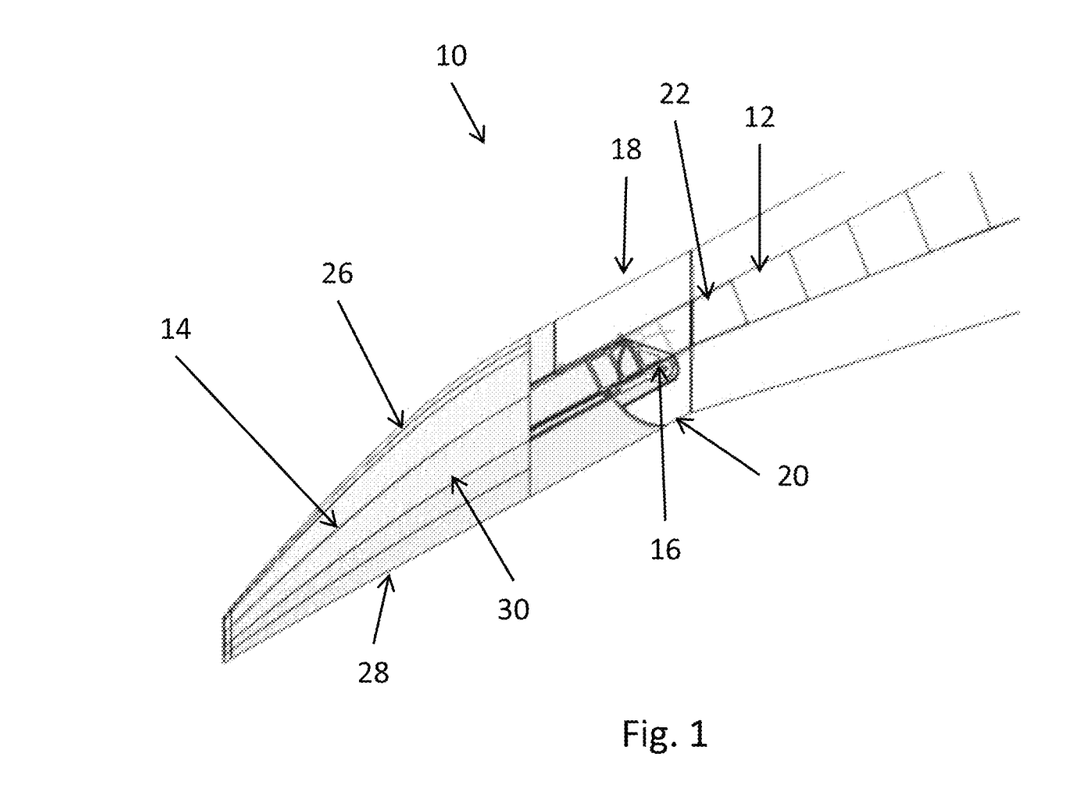
FIG. 1 shows a schematic view of part of an aircraft wing according to a first embodiment of the invention, the wing tip device being in a flight configuration.
Figure 2:
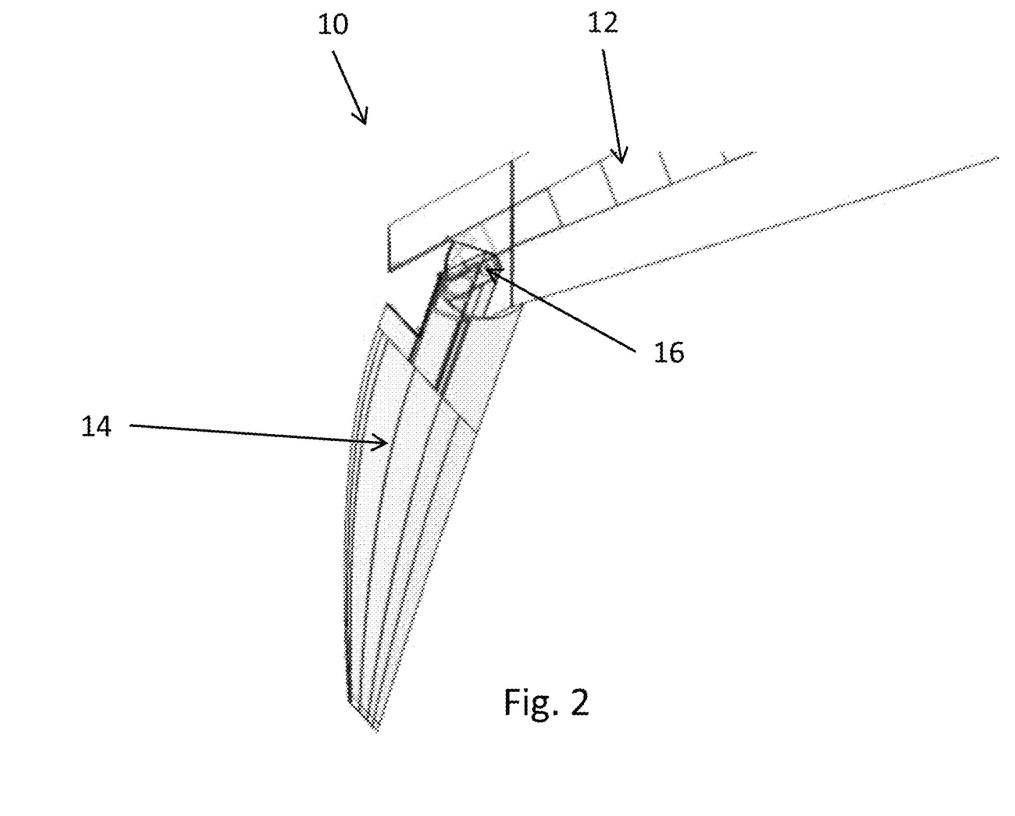
FIG. 2 shows the aircraft wing as shown in FIG. 1, with the wing tip device in a ground configuration.
Figure 7:
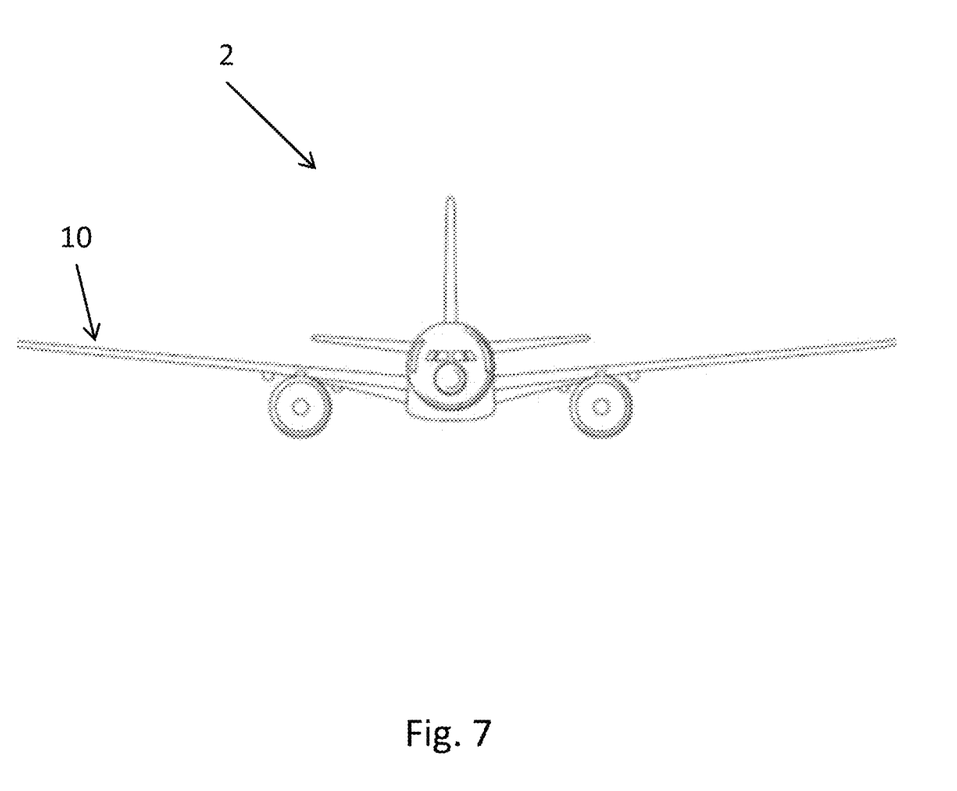
FIG. 7 shows an aircraft incorporating the wing of FIGS. 1 and 2.

FIGS. 1 and 2 show the outer part of an aircraft wing 10 comprising a fixed wing 12 and a swing wing tip device 14. The aircraft wing is on an aircraft 2, shown in FIG. 7.

The swing wing tip device 14 is pivotally linked to the fixed wing 12 about a pivot point 16 located in the tip region of the fixed wing 12. The swing wing tip device 14 is configurable between: (i) a flight configuration for use during flight, as shown in FIG. 1, and (ii) a ground configuration for use during ground-based operations, as shown in FIG. 2, in which ground configuration the wing tip is swung rearwardly approximately 45 degrees, away from the flight configuration, such that the span of the aircraft wing is reduced. The fixed wing 12 comprises a leading edge 18, a trailing edge 20, an upper wing skin 22 and a lower wing skin 24 (not visible in FIGS. 1 and 2). The swing wing tip device 14 comprises a leading edge 26, a trailing edge 28, an upper wing skin 30, and a lower wing skin 32 (not visible in FIGS. 1 and 2).

When in the flight configuration (see FIG. 1) the leading edge 26 of the swing wing tip device and leading edge 18 of the fixed wing are continuations of one another. The trailing edge 28 of the swing wing tip device and the trailing edge 20 of the fixed wing are also continuations of one another. The upper wing skins 22, 30 define an approximately continuous surface, and the lower wing skins 24, 32 define an approximately continuous surface.

The axis of rotation 16' of the pivot 16, about which the swing wing tip device 14 rotates, is perpendicular to the plane of the wing. For the sake of clarity, the axis 16' is only shown in FIGS. 4 and 5.

Figure 3:
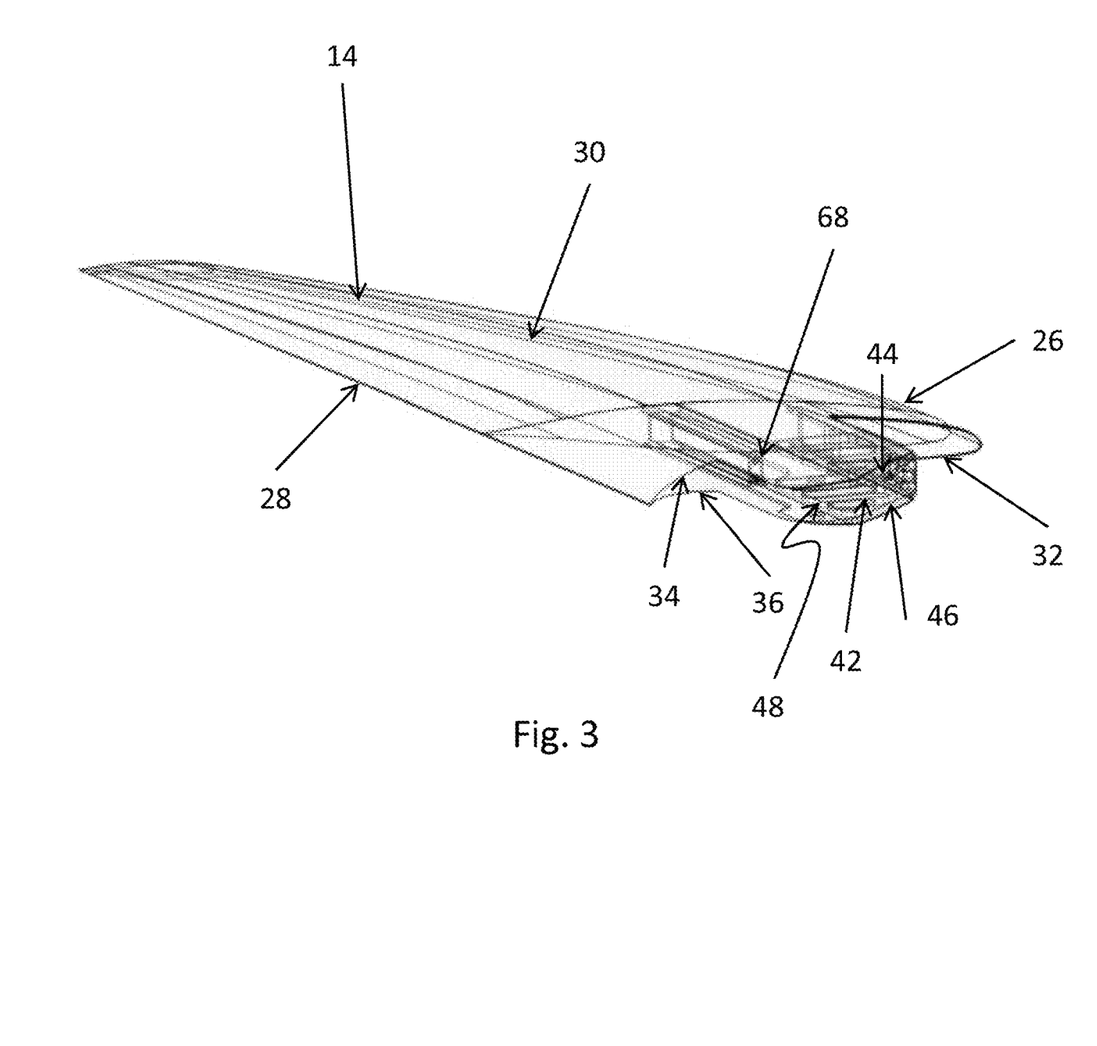
FIG. 3 shows the swing wing tip device in the first embodiment of the invention.
Figure 4:
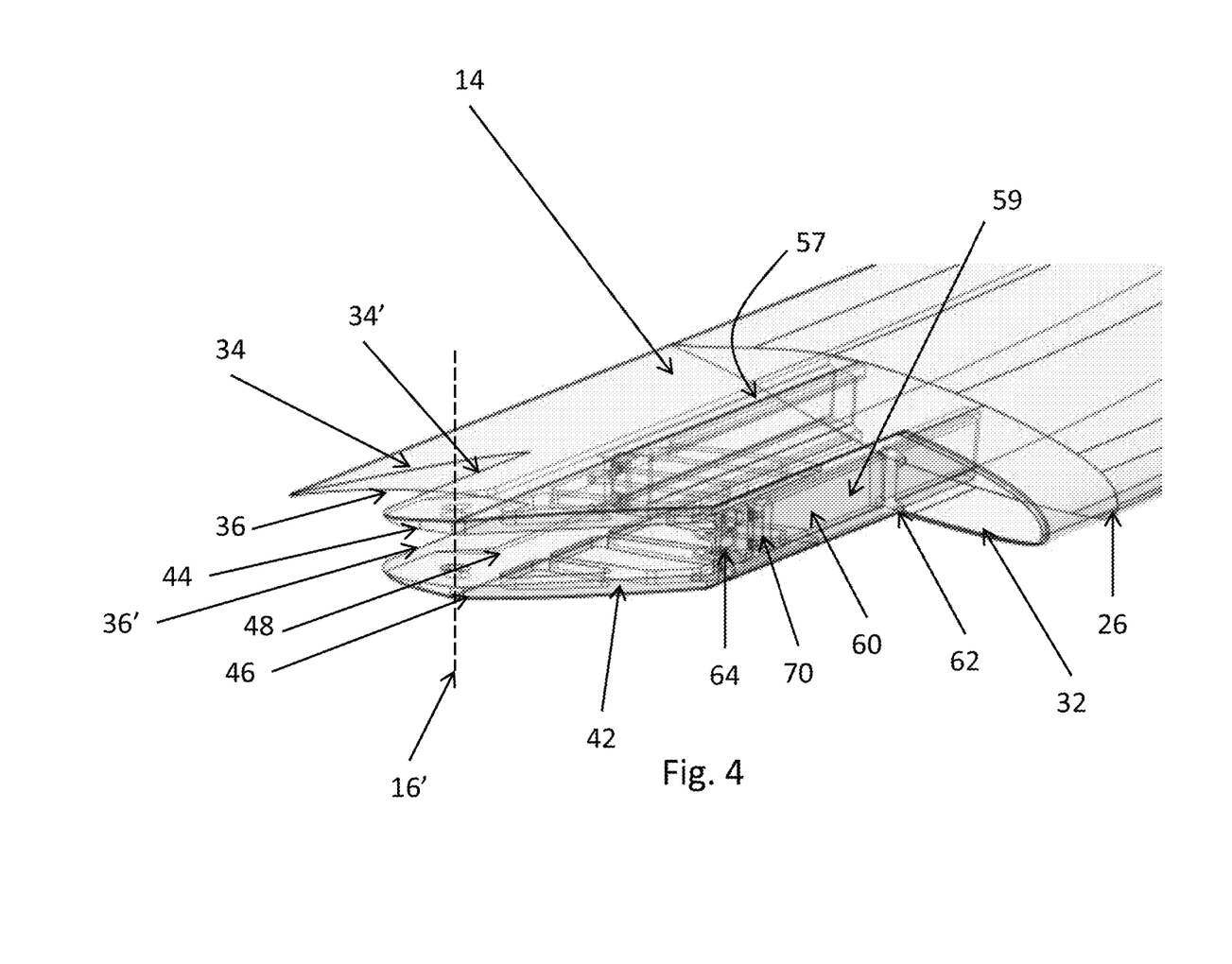
FIG. 4 shows an alternative view of the swing wing tip device shown in FIG. 3.
Figure 5:
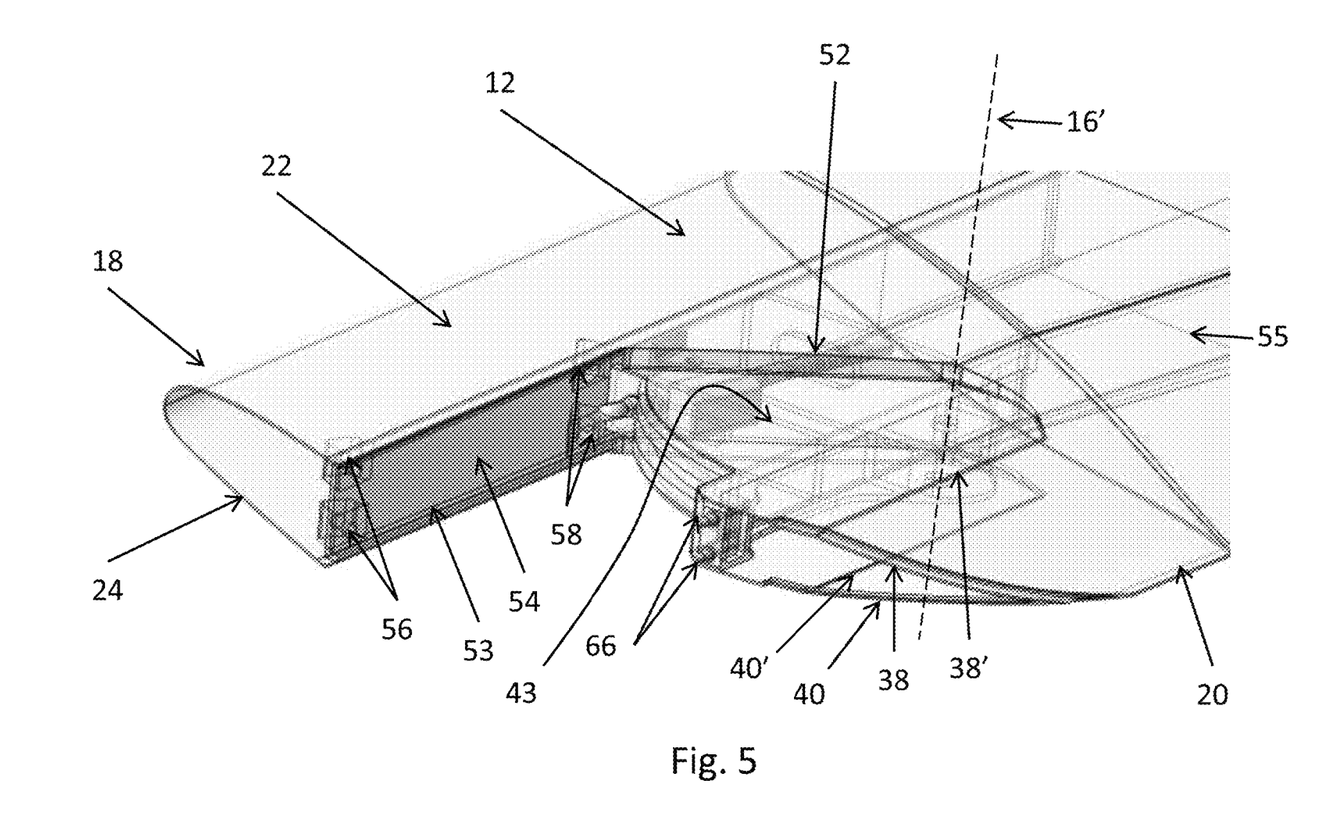
FIG. 5 shows part of the fixed wing in the first embodiment of the invention.

FIGS. 3 and 4 shows the swing wing tip device 14 in isolation, and FIG. 5 shows the fixed wing 12 is isolation. In these, and other, figures, some of the parts of the swing wing tip device (for example the upper and lower skins) are shown partially transparent to assist the understanding of the internal structure of the wing tip device.

Referring to those figures, it will be observed that a curved interfacing edge 34 extends from the trailing edge 28 of the swing tip device, along the upper wing skin 30, and a similar curved interfacing edge 36 extends from the trailing edge 28 along the lower wing skin 32. With reference to FIG. 5, these interfacing edges 34, 36 on the swing wing tip 14 correspond to curved interfacing edges 38, 40 on the fixed wing 12. The interfacing edges extend in an approximately circular arc with a centre point around the pivot point 16. The interfacing edges 38 and 40 slightly overlap the interfacing edges 34 and 36 on the inside of the interfacing edges 34 and 36, such that rotating the swing wing tip device 14 from the flight configuration to the ground configuration is enabled, whilst still providing a smooth, aerodynamic surface at the top and bottom of the aircraft wing when in the flight configuration.

In addition to the curved portions 34, 36, 38, 40 of the interfacing edges, it can be seen in the figures that the swing wing tip device 14 and fixed wing 12 also comprise respective straight portions of the interfacing edge 34', 36', 38' and 40' which extend from a location near the pivot 16, in a direction long the length of the wing, to the respective circular arc portion of the interfacing edge. A blade seal (not shown in the figures) is located along the straight interfacing edge 38', 40' of the fixed wing to ensure there is a smooth, sealed, transition between the surfaces of the fixed wing and swing wing tip device when in the wing tip is in the flight configuration.

The swing wing tip device 14 includes a frame 42 located between the upper wing skin 30 and lower wing skin 32. The frame 42 surrounds a recessed portion 43 in the tip of the fixed wing (see FIG. 5) and connects to the pivot point 16. The frame is shown in isolation in FIGS. 6a and 6b.

The frame 42 has an upper portion 44 proximate to the upper wing skin of the swing wing tip device and a lower portion 46 proximate to the lower wing skin of the swing wing tip device. The upper and lower portions 44, 46 of the frame each comprise planar inner surfaces 44' and 46'. The inner surfaces 44', 46' are co-planar with the plane of the wing and normal to the pivot axis 16'. It will be appreciated that the inner surfaces need not necessarily be solid (for example, they may be webbed as shown in FIGS. 6a and 6b).

Figures 6A, 6B:
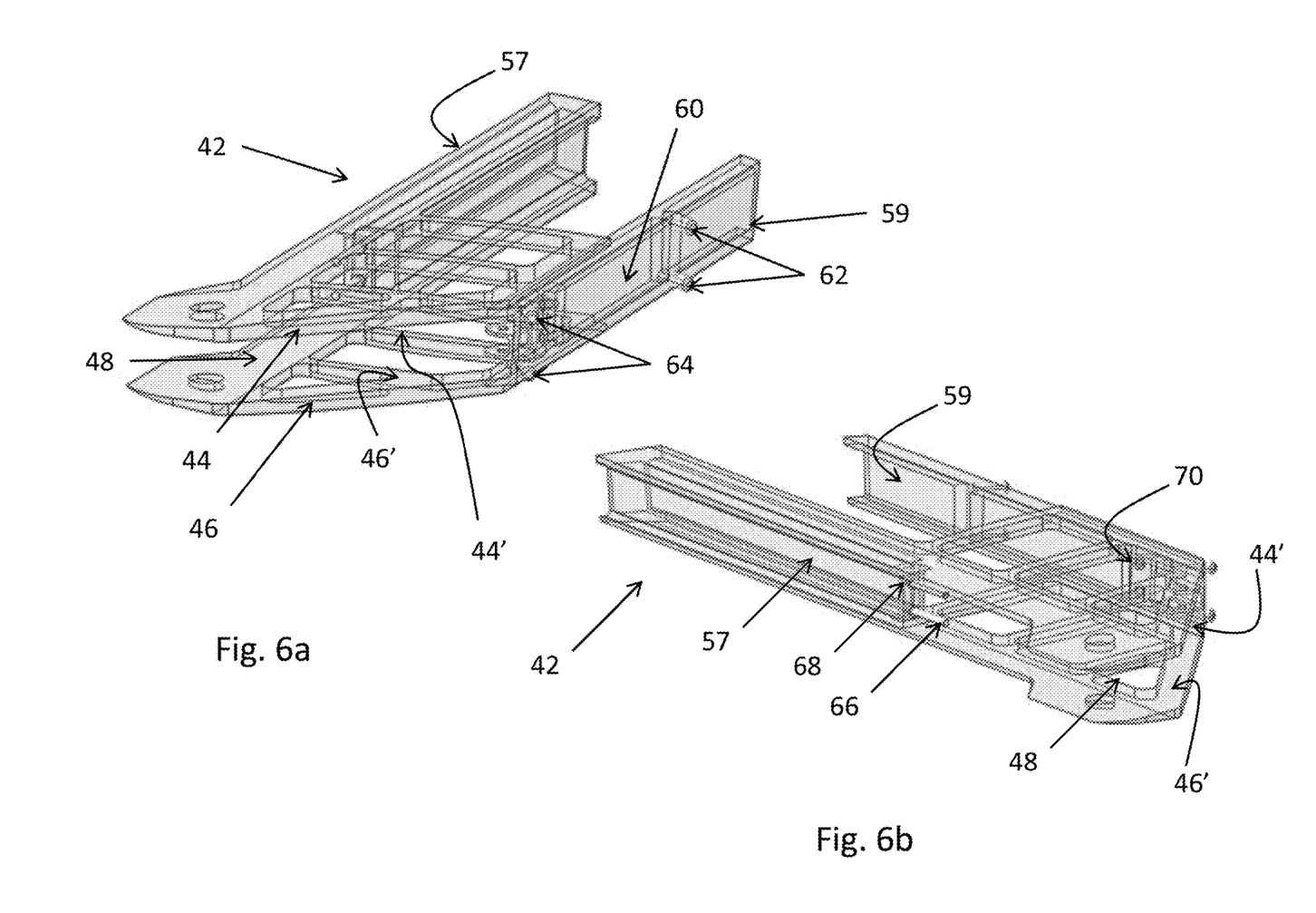
FIGS. 6a and 6b show the frame in the swing wing tip device of FIGS. 3 and 4.

As most clearly shown in FIGS. 4 and 6a, the thickness of the upper and lower portions 44', 46' tapers (in the chordwise direction), such that the upper and lower wing skins of the swing wing tip device converge on the respective inner surfaces along the straight interfacing edges 34', 36' of the swing wing tip device.

The frame 42 also comprises a rear spar 57 and a front spar 59 of the swing wing tip device. Those features are discussed in more detail below with reference to the locking mechanism.

Between the inner surfaces 44' and 46' of the upper frame portion 44 and lower frame portion 46 is a receiving portion 48. The receiving portion 48 is essentially an empty space which can receive part of the distal end of the fixed wing 12, when the wing 10 is in the ground configuration (discussed in more detail below).

As can be seen from FIGS. 1 and 2, when the swing wing tip device 14 moves from the flight configuration to the ground configuration, the straight portion of the interfacing edge 34', 36' on the swing wing tip device 14 moves over part of the upper wing skin 22 and lower wing skin 24 on the fixed wing (which part having been exposed in the flight configuration). These parts of the upper wing skin 22 and lower wing skin 24 on the fixed wing, are thus received within the receiving portion 48 of the swing wing tip.

By having part of the fixed wing received within part of the swing wing tip, the first embodiment of the invention removes the need for moving parts around the trailing edge of the fixed wing, for example panel or flaps on the wing skin that are movable in order that the swing wing tip device and the fixed wing do not foul each other. Therefore, a simplified wing structure is provided.

The swing wing tip device 14 is moved from the flight configuration to the ground configuration by the action of an electrically actuated mechanical ballscrew 52 (shown in FIG. 5). The ballscrew 52 is associated with the fixed wing 12 and is in contact with the frame 42, whereby actuation of the ballscrew pushes the swing wing tip device 14 around the pivot point 16 when moving from the flight configuration to the ground configuration, and pulls the swing wing tip device 14 around the pivot point 16 when moving from the ground configuration to the flight configuration. In other embodiments of the invention (not shown), the ballscrew may be hydraulically actuated.

As can be seen most clearly in FIG. 5, the fixed wing 12 includes a front spar 53 which overlaps (in a spanwise direction) with a corresponding front spar 59 on the frame 42 of the swing wing tip device 14. This overlapping portion includes a bearing surface 54 provided on the front spar 53 of the fixed wing 12 and two pairs of locking holes 56 and 58. A corresponding bearing surface 60 of a front spar 59 of the frame 42 is configured with pairs of locking pins 62 and 64. When the wing 10 is in the flight configuration, the bearing surface 54 and bearing surface 60 are in contact, and the locking pins 62 and 64 associated with the frame extend into the locking holes 56 and 58 of the fixed wing, to lock the swing wing tip 14 in position. The orientation and spacing of the locking holes 56, 58, and the locking pins 62, 64, is such that flight loads experienced by the swing wing tip device 14 can be reacted through the bearing surfaces and locking pins/holes, to the fixed wing 12. In effect, the front spar of the swing wing tip device becomes an extension of the front spar of the fixed wing.

The longitudinal axes of the pins (and of the holes) are tangential to a notional circle, centred on the pivot 16 axis 16', passing through the pins/holes. This ensures that as the swing wing tip device rotates about the pivot, the pins and respective holes engage/disengage each other in a substantially linear motion.

The fixed wing 12 also includes a rear spar 55. The pivot point 16 located slightly aft of the rear spar. The frame 42 includes a rear spar portion 57 which may connect with the rear spar of the fixed wing 12 when the wing 10 is in the flight configuration.

The fixed wing 12 also includes locking pins 66, which engage with a first pair of locking holes 68 in the frame 42 when the wing 10 is in the flight configuration. The swing wing tip device is also arranged such that those same pins 66 engage with a second pair of locking holes 70 (in the front of the frame 42) when the swing wing tip is in the ground configuration. The longitudinal axes of the holes 70 are at an angle to the front spar such that when the swing wing tip device is in the ground configuration, the axes of the holes 70 are aligned with the locking pins 66.

As most clearly shown in FIG. 4, the inner end of the swing wing tip comprises an open-box structure. This occurs because the front spar 59 is staggered with respect to the rear spar 57. Thus, at the inner end of the swing wing tip device the open box structure is defined by the wing skins (on the upper and lower portions 44, 46 of the frame 42), and the rear spar 57. Although the open box structure may make the ground configuration unsuitable for flight, it has been recognised that this is not necessarily a problem as the aircraft will not take off whilst the swing wing tip device is in the ground configuration. This is in contrast to some known military swing wing applications, in which it is essential for the wing tip to comprise a closed-box structure as that closed box structure tends to be exposed to freestream airflow during flight.

Whilst the present invention has been described and illustrated with reference to particular embodiments, it will be appreciated by those of ordinary skill in the art that the invention lends itself to many different variations not specifically illustrated herein.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention is:

1. An aircraft comprising a wing, the wing comprising a fixed wing and a swing wing tip device pivotably mounted about a pivot at a tip of the fixed wing, wherein the swing wing tip device is configurable between:
  (i) a flight configuration for use during flight; and
  (ii) a ground configuration for use during ground-based operations, in which ground configuration the swing wing tip device is swung rearwardly, away from the flight configuration, such that the span of the aircraft wing is reduced;
  wherein the swing wing tip device comprises a leading edge, a trailing edge, an upper wing skin and a lower wing skin, and a receiving portion located between the upper wing skin and lower wing skin, and the fixed wing comprises a leading edge, a trailing edge, an upper wing skin and a lower wing skin,
  wherein when the swing wing tip device is in the flight configuration, the upper and lower wing skins of the swing wing tip device are substantially continuous with the respective upper and lower wing skins of the fixed wing, and the leading and trailing edges of the swing wing tip device are continuations of the respective leading and trailing edges of the fixed wing, and
  wherein the receiving portion of the swing wing tip is arranged such that in the ground configuration, portions of the upper wing skin and lower wing skin of the fixed wing, which are exposed in the flight configuration, are received within the receiving portion of the swing wing.

2. The aircraft as claimed in claim 1, wherein the swing wing tip device comprises a frame located between the upper wing skin and lower wing skin of the swing wing tip device,
  the frame being pivotably mounted on the pivot and the frame having an upper portion proximate to the upper wing skin of the swing wing tip device and a lower portion proximate to the lower wing skin of the swing wing tip device, and
  wherein the receiving portion of the swing wing tip device is located between the upper portion and lower portion of the frame.

3. The aircraft as claimed in claim 1, wherein the upper wing skin of the fixed wing and the upper wing skin of the swing wing tip device each comprise an interfacing edge, and the lower wing skin of the fixed wing and the lower wing skin of the swing wing tip device each comprise an interfacing edge, and
  wherein, during movement of the swing wing tip device from the flight configuration, to the ground configuration, part of the interfacing edges of the swing wing tip device is moved over part of the interfacing edges of the fixed wing.

4. The aircraft as claimed in claim 3, wherein at least a portion of an interfacing edge extends in a direction along the length of the wing.

5. The aircraft as claimed in claim 3, wherein at least a portion of an interfacing edge extends in an arc with a centre point located approximately at the pivot.

6. The aircraft as claimed in claim 1, wherein at least 80% of the span of the wing comprises the fixed wing.

7. The aircraft as claimed in claim 1, wherein the fixed wing comprises a front spar and the swing wing tip device comprises a front spar, and in the flight configuration the front spar of the fixed wing and the front spar of the swing wing tip device at least partially overlap.

8. The aircraft as claimed in claim 7, further comprising a locking mechanism associated with the front spar of the fixed wing and the front spar of the swing wing tip device, arranged to lock the front spar of the fixed wing to the front spar of the swing wing tip device when the swing wing tip device is in the flight configuration, such that the front spar of the swing wing tip device becomes an extension of the front spar of the fixed wing.

9. The aircraft according to claim 8, wherein the locking mechanism comprises one or more pins extending from one of the front spar of the fixed wing and the front spar of the swing wing tip device into a locking aperture in the other of the front spar of the fixed wing and the front spar of the swing wing tip device,
  and wherein a longitudinal axes of the locking pins and the apertures are tangential to a notional circle, centred on the pivot, passing through the locking pins and apertures.

10. The aircraft as claimed in claim 1, wherein the fixed wing comprises a rear spar and the swing wing tip device comprises a rear spar, and in the flight configuration the rear spar of the fixed wing and the rear spar of the swing wing tip device at least partially overlap.

11. The aircraft as claimed in claim 10, further comprising a locking mechanism associated with the rear spar of the fixed wing and the rear spar of the swing wing tip device, arranged to lock the rear spar of the fixed wing to the rear spar of the swing wing tip device when the swing wing tip device is in the flight configuration, such that the rear spar of the swing wing tip device becomes an extension of the rear spar of the fixed wing.

12. The aircraft as claimed in claim 11, wherein the locking mechanism is arranged to lock the front spar of the swing wing tip device to the fixed wing when the swing wing tip device is in the ground configuration.

13. The aircraft as claimed in claim 1, wherein the swing wing tip device comprises an open box structure.

14. A swing wing tip device configured to be pivotably mounted to a tip region of a fixed wing, wherein the swing wing tip device comprises a leading edge, a trailing edge, an upper wing skin and a lower wing skin, and a receiving portion located between the upper wing skin and lower wing skin,
  wherein the swing wing tip device is arranged to be configurable between: (i) a flight configuration for use during flight; and (ii) a ground configuration for use during ground-based operations, in which ground configuration the swing wing tip device is swung rearwardly, away from the flight configuration, such that the span of the aircraft wing is reduced;
  wherein when the swing wing tip device is arranged such that in the flight configuration, the upper and lower wing skins of the swing wing tip device are configured to be substantially continuous with respective upper and lower wing skins of the fixed wing, and the leading and trailing edges of the swing wing tip device are configured to be continuations of respective leading and trailing edges of the fixed wing, and the receiving portion of the swing wing tip is arranged to expose upper and lower portions of the fixed wing while the swing wing tip is in the flight configuration, and the receiving portion of the swing wing tip is arranged to receive the upper and lower portions of the fixed wing while the swing wing tip is in the ground configuration.

15. A fixed wing comprising a leading edge, a trailing edge, an upper wing skin and a lower wing skin, and the fixed wing including a tip region having a pivot configured to receive a pivoting swing wing tip device, the swing wing tip device being configurable between: (i) a flight configuration for use during flight; and (ii) a ground configuration for use during ground-based operations, in which ground configuration the swing wing tip device is swung rearwardly, away from the flight configuration, such that the span of the aircraft wing is reduced;

and wherein when the swing wing tip device is in the flight configuration, the upper and lower wing skins of the swing wing tip device are configured to be substantially continuous with the respective upper and lower wing skins of the fixed wing, and the leading and trailing edges of the swing wing tip device are configured to be continuations of the respective leading and trailing edges of the fixed wing, and wherein the fixed wing comprises upper and lower portions which are arranged to be exposed in the flight configuration, and to be received within a receiving portion of the swing wing when the swing wing tip is in the ground configuration.

16. A fixed wing according to claim 15, wherein the fixed wing comprises a recessed portion at the tip of the fixed wing, through which the axis of the pivot passes, the recessed portion being arranged such that when the swing wing tip device is in the flight configuration, the recessed portion is received in the receiving portion of the swing wing tip device.

17. An aircraft comprising a wing, the wing comprising a fixed wing and a swing wing tip device pivotably mounted about a pivot at a tip of the fixed wing, wherein the swing wing tip device is configurable between:

(i) a flight configuration for use during flight; and (ii) a ground configuration for use during ground-based operations, in which ground configuration the swing wing tip device is swung rearwardly, away from the flight configuration, such that the span of the aircraft wing is reduced;

wherein the fixed wing comprises a front and a rear spar and the swing wing tip device comprises a front and a rear spar, and in the flight configuration the rear spar of the fixed wing and the rear spar of the swing wing tip device at least partially overlap wherein the aircraft comprises a locking pin associated with one of the fixed wing or the swing wing tip device, and first and second apertures associated with the other of the fixed wing and the swing wing tip device, wherein the first aperture is located such that in the flight configuration the locking pin is received in the first aperture to lock the rear spar of the fixed wing to the rear spar of the swing wing tip device, and wherein the second aperture is located such that in the ground configuration the same locking pin is received in the second aperture to lock the swing wing tip device to the rear spar of the fixed wing.

* * * * *